United States Patent
Keyes et al.

(10) Patent No.: US 6,582,193 B1
(45) Date of Patent: Jun. 24, 2003

(54) COMPOSITE WATER AND POWER STEERING PUMP ASSEMBLY

(76) Inventors: Kevin D Keyes, 11978 Lennry, Shelby Township, MI (US) 48315; Gary F Korejwo, 566 Wyngate Dr., Rochester, MI (US) 48307; Anthony C Barr, 1345 Bates, Birmingham, MI (US) 48009

( * ) Notice: Subject to any disclaimer, the term of this patent is extended or adjusted under 35 U.S.C. 154(b) by 267 days.

(21) Appl. No.: 09/627,894

(22) Filed: Jul. 27, 2000

(51) Int. Cl.$^7$ ................................................. F03D 11/00
(52) U.S. Cl. ....................................................... 415/231
(58) Field of Search ............................ 415/231, 204 R; 416/244 R, 244 A

(56) References Cited

U.S. PATENT DOCUMENTS

| | | | | |
|---|---|---|---|---|
| 2,733,682 A | * | 2/1956 | Langteau | 415/204 |
| 3,594,102 A | * | 7/1971 | Oden | 416/244 R |
| 3,597,105 A | * | 8/1971 | Sadler | 415/204 |
| 3,730,147 A | * | 5/1973 | Buchwald | 123/41.44 |
| 3,873,242 A | * | 3/1975 | Anderson | 417/360 |
| 4,114,586 A | | 9/1978 | Fujikawa et al. | |
| 4,203,710 A | * | 5/1980 | Farr | 417/53 |
| 4,306,841 A | * | 12/1981 | Morrison et al. | 417/360 |
| 4,412,515 A | | 11/1983 | Fritzenwenger | |
| 4,436,067 A | | 3/1984 | Fritzenwenger | |
| 4,486,668 A | | 12/1984 | Asahi et al. | |
| 4,548,547 A | * | 10/1985 | Deuring | 415/170 |
| 5,009,570 A | * | 4/1991 | Richardson | 415/174.2 |
| 5,151,010 A | | 9/1992 | Vesala et aL. | |
| 5,195,479 A | | 3/1993 | Hasetoh et al. | |
| 5,282,446 A | | 2/1994 | Whitefield | |

FOREIGN PATENT DOCUMENTS

DE 3409605 9/1985

* cited by examiner

*Primary Examiner*—Christopher Verdier
*Assistant Examiner*—James M McAleenan

(57) ABSTRACT

A combination in-line type water pump and power steering pump assembly which includes a power steering shaft with an outer end portion extending into a pumping chamber of the water pump. The outer end portion of the shaft is configured to removably support a tubular shaft sleeve and a water pump impeller thereon. A seal annulus is mounted in the pump housing and encompasses the shaft sleeve in water tight relation therewith at an inwardly location from the impeller. The impeller and the seal annulus are removable from the sleeve by application of an axial force to slip the impeller and seal annulus axially along the outer end of the shaft sleeve.

14 Claims, 2 Drawing Sheets

COMPOSITE WATER AND POWER STEERING PUMP ASSEMBLY

BACKGROUND OF THE INVENTION

1. Field of the Invention

This invention relates generally to an in-line water pump and power steering pump assembly.

2. Description of Related Art

Water pump failure usually occurs as a result of leakage between a shaft and a seal. When a leak develops, the typical solution is to replace the entire water pump which usually is economical. However, when a water pump and a power steering pump are combined, replacement of the combined unit becomes prohibitively expensive. An arrangement wherein the water pump seal can be easily serviced and replaced without requiring the entire water pump and power steering pump assembly to be replaced is necessary.

SUMMARY OF THE INVENTION

In the present invention, the rotatable shaft of the combined power steering pump and water pump has an impeller-driving end portion which projects into the pumping chamber of the water pump and is configured to receive a tubular sleeve. This shaft sleeve can be threaded on to the end portion of the shaft. A water pump impeller is removably secured on to an outer end of the shaft sleeve. Also secured about the shaft sleeve inboard from the impeller is a annular seal assembly which engages the shaft sleeve in a water tight sealing relation. The seal assembly can be removed when the impeller is removed or whenever the impeller and shaft sleeve are removed.

Preferably the impeller is press fit on the shaft sleeve. This facilates removal for service especially of the seal assembly as the impeller is mounted by axially slipping it over the outer end of the shaft sleeve. The water pump assembly utilizes a two part housing which defines the pumping chamber where the impeller and seal assembly are located. This permits ready access to the impeller and the seal assembly.

The sealing arrangement of the water pump is preferably employed in a combined and in-line water pump and power steering pump combination assembly wherein a common drive shaft is used.

One object of this combined water pump and power steering pump assembly is to provide a shaft seal assembly for the water pump which is readily serviceable and has the foregoing features and capabilities.

Another object is to provide a shaft seal assembly for a combined water pump and power steering pump assembly which is capable of being replaced without requiring disassembly or replacement of the entire assembly, and which is relatively inexpensive to manufacture and assemble.

BRIEF DESCRIPTION OF THE DRAWINGS

These and other objects, features and advantages of the invention will become more apparent as the following description proceeds, especially when considered with the accompanying drawings.

DETAILED DESCRIPTION OF THE PREFERRED EMBODIMENT

Figure 1:
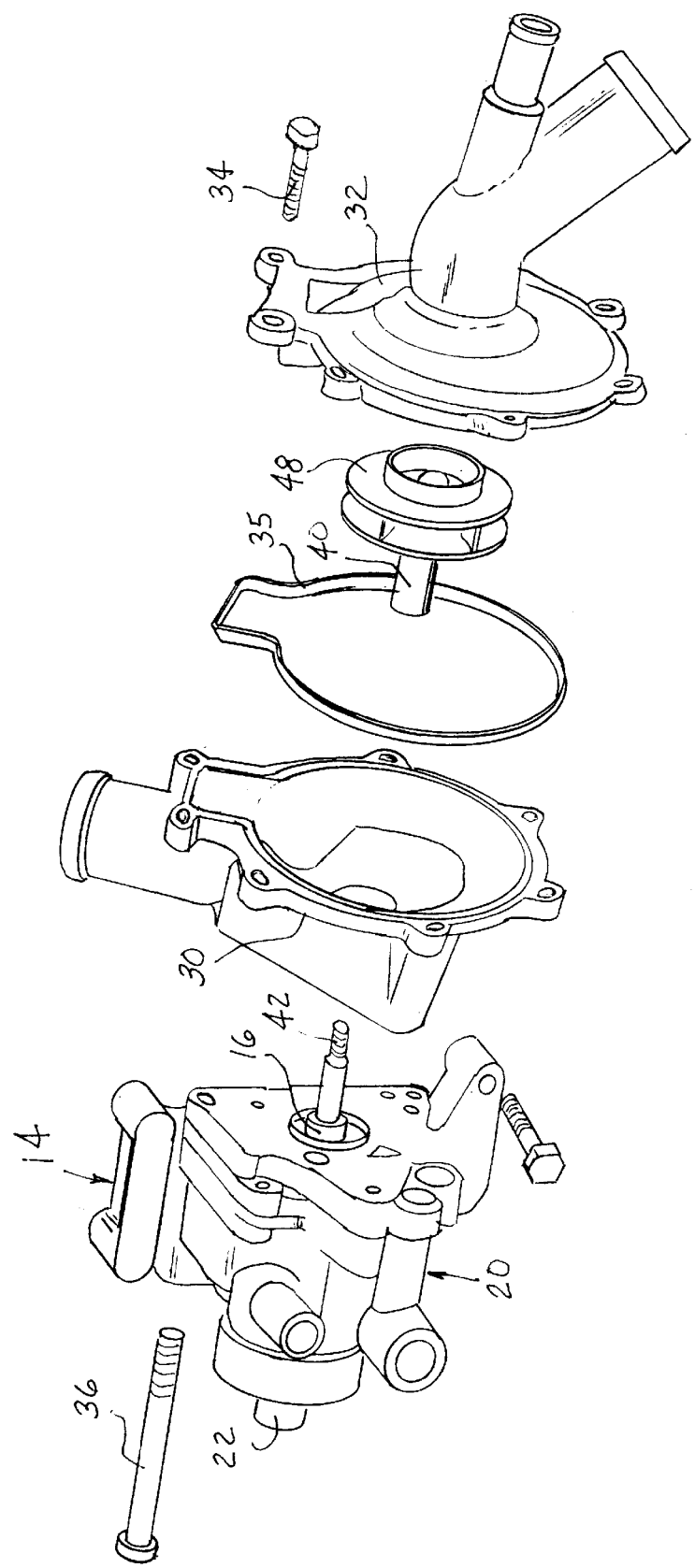
FIG. 1 is an exploded perspective view of a combination, in-line water pump and power steering pump assembly having a shaft seal assembly.
Figure 2:
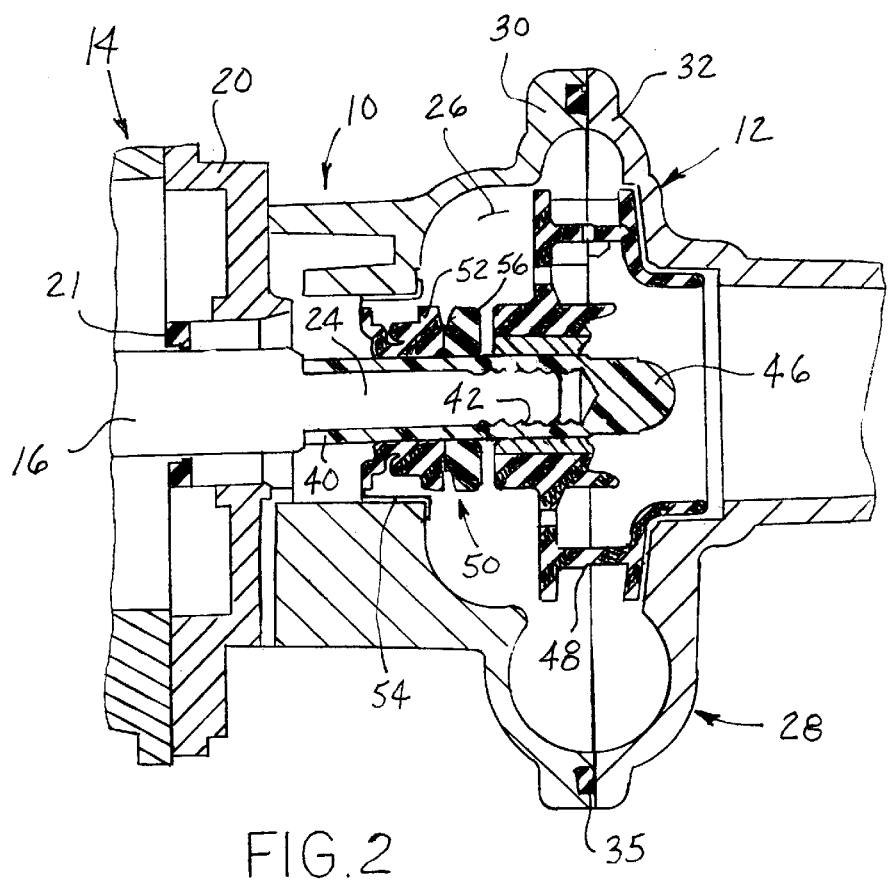
FIG. 2 is a sectioned, side elevational view of the combination pump assembly shown in FIG. 1.

Referring now more particularly to the drawings, and especially FIGS. 1 and 2, a combination, in-line type water pump and power steering pump assembly 10 is shown. The assembly 10 including a water pump portion 12 and a power steering pump portion 14. The power steering pump 14 has a shaft 16 rotated by the associated engine, which also serves as the power shaft for a bladed impeller 48 of the water pump portion 12.

The power steering pump portion 14 has a pump housing 20 in which shaft 16 is supported for rotation. As can be seen in FIG. 2, the rightward end portion of shaft 16 has a seal 21 extending thereabout and supported by the housing 20 for sealing power steering fluid in housing 20. The shaft 16 receives rotational input from the engine at a leftward end 22 as seen in FIG. 1. Rotation of the shaft operates a conventional interior mechanism of the power steering pump for pressurizing and circulating power steering fluid as is known in the art.

Referring to FIG. 2, the rightward end of shaft 16 projects from the power steering housing 20 into the interior of the water pump portion 12. The end of the shaft 16 is configured with a stem-like impeller-driving portion 24 with a reduced diameter. Portion 24 extends into a water pumping chamber 26 as defined by a water pump housing assembly 28. The water pump housing assembly 28 includes a pair of mating housing parts 30 and 32 which come together in an end to end relationship and are secured together by suitable means such as fasteners 34 (one of which is seen in FIG. 1). An annular seal 35 is supported in a groove to inhibit leakage of water between the two mated parts 30 and 32. The housing 28 of the water pump portion 12 and particularly the part 30 thereof is attached to the housing 20 of the power steering pump portion 14 by fasteners 36 (one of which is shown in FIG. 1).

An elongated tubular shaft sleeve 40 is axially fitted over on to the end impeller-driving stem portion 24 of the shaft 16. Preferably, the shaft sleeve 40 has internal threads for engagement with a correspondingly threaded portion 42 of the impeller-driving stem portion 24. An integral rounded end portion or cap portion 46 covers the end of the sleeve 40.

The bladed impeller 48 is secured on to and around the shaft sleeve 40 adjacent to the rightward, outer end thereof. Impeller 48 is press fit on the shaft sleeve and may be readily removed by application of a force which causes the impeller to be axially slipped to the right along the sleeve and then over its outer end protion 46.

A seal annulus 50 is provided within the water pump housing 28. This seal 50 surrounds the shaft sleeve 40 in water tight relation therewith at a more inward position from the outer or rightward end of the shaft sleeve 40 and the impeller 48. More specifically, the annular seal assembly 50 includes a part 52 encirling the shaft sleeve 40 and including a radially outwardly extending mounting collar 54, preferably of metal, which is securly mounted to housing part 30. Another part 56 of the seal assembly encircles and is mounted on the shaft sleeve 40. Sealing is provided between the end faces of the parts 52, 56.

The housing 30, sleeve 40, impeller 48, and seal assembly 50 are assembled into a module assembly and an arbor press is required to dissassemble the parts. Therefore, when the seal assembly 50 requires replacement (due to leakage), the module of parts 30, 40, 48, and 50 is replaced. First, the fasteners 34 and 36 are removed to allow the housing part 32 to be separated from part 30. Then, the sleeve 40 is unscrewed from the shaft end 24. This removes impeller 48 and seal part 56.

Figure 3:
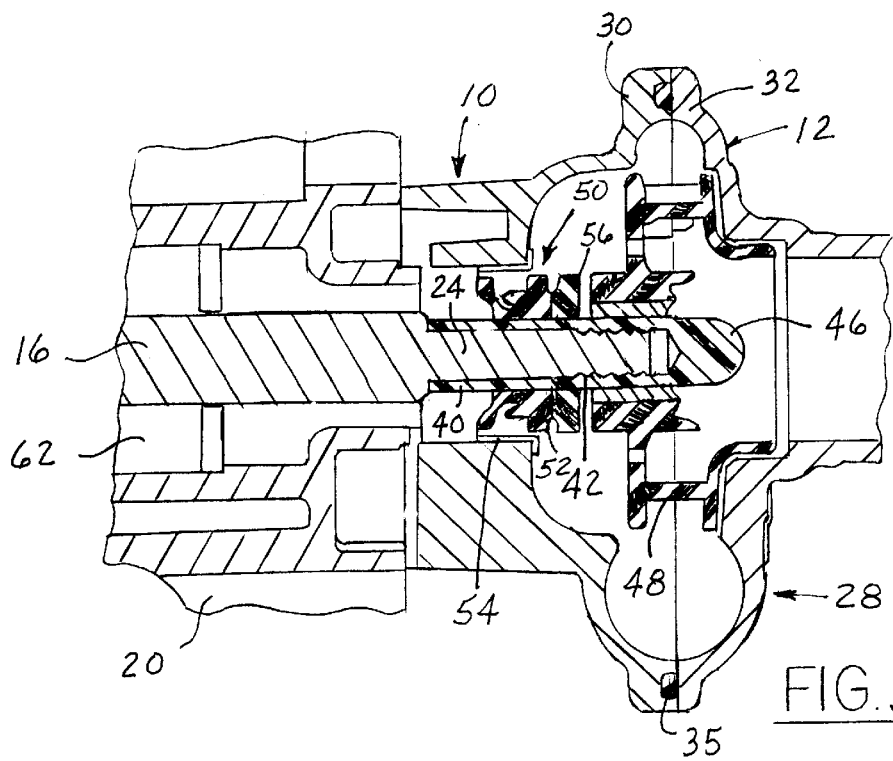
FIG. 3 is a sectioned, side elevational view of a modification of the pump assembly similar to FIG. 2, but for an application in which the water pump stands alone, i.e. without a power steering pump.

In FIG. 3, the water pump assembly 12 is shown in a vehicle application where no power steering is provided. Therefore, the water pump portion 12 needs a support. The parts of the water pump shown in FIG. 3 are the same as the parts of the water pump in FIG. 2 and have the same reference numerals. The shaft 16 is not part of a power steering pump but is the same configuration supported in a bearing carrier housing 60 for the bearing 62 and bearing carrier 62 secured to the water pump housing. The drawings and descriptions of the embodiments are for the purpose of provided a working apparatus and should not be construed as limiting the invention which is defined by the following claims.

We claim:

1. A water pump comprising:
   a pump housing having a pumping chamber;
   a rotatable shaft having an impeller-driving portion extending into said pumping chamber;
   a shaft and bearing carrier for supporting said shaft for rotation;
   a tubular shaft sleeve axially fitted over the impeller-driving portion of said shaft;
   an impeller removably secured on the outermost diameter of said shaft sleeve adjacent an outer end thereof;
   a seal annulus mounted in said housing and encompassing the shaft sleeve in water tight relation therewith at a point more remote from the outer end of said shaft sleeve than said impeller;
   said seal annulus being removable by being axially slipped over the outer end of said shaft sleeve when said impeller is removed.

2. A water pump as defined in claim 1, wherein said impeller has a press fit on said shaft sleeve.

3. A water pump as defined in claim 1, wherein said impeller is removed by being axially slipped over the outer end of said shaft sleeve.

4. A water pump as defined in claim 1, wherein said pump housing has separable first and second housing parts which cooperate with one another to define said pumping chamber, and means releasably securing said housing parts together.

5. A water pump as defined in claim 4, wherein said impeller has a press fit on said shaft sleeve, and said impeller is removed by being axially slipped over the outer end of said shaft sleeve.

6. A water pump as defined in claim 5, wherein said shaft sleeve is axially removable from the impeller-driving portion of said shaft.

7. A water pump as defined in claim 5, wherein said shaft sleeve is threaded on and axially removable from the impeller-driving portion of said shaft.

8. An in-line water pump and power steering pump assembly, comprising:
   a power steering pump having a rotatable shaft;
   a water pump having a pump housing defining a pumping chamber;
   said rotatable shaft having an impeller-driving portion extending into the pumping chamber;
   a tubular shaft sleeve axially fitted over the impeller-driving portion of said shaft;
   an impeller removably secured on the outermost diameter of said shaft sleeve adjacent an outer end thereof;
   a seal annulus mounted in said housing and encompassing the shaft sleeve in water tight relation therewith at a point more remote from the outer end of said shaft sleeve than said impeller;
   said seal annulus being removable by being axially slipped over the outer end of said shaft sleeve when said impeller is removed.

9. An in-line water pump and power steering pump assembly as defined in claim 8, wherein said impeller has a press fit on said shaft sleeve.

10. An in-line water pump and power steering pump assembly as defined in claim 8, wherein said impeller is removed by being axially slipped over the outer end of said shaft sleeve.

11. An in-line water pump and power steering pump assembly as defined in claim 8, wherein said pump housing has separable first and second housing parts which cooperate with one another to define said pumping chamber, and means releasably securing said housing parts together.

12. An in-line water pump and power steering pump assembly as defined in claim 11, wherein said impeller has a press fit on said shaft sleeve, and said impeller is removed by being axially slipped over the outer end of said shaft sleeve.

13. An in-line water pump and power steering pump assembly as defined in claim 12, wherein said shaft sleeve is axially removable from the impeller-driving portion of said shaft.

14. An in-line water pump and power steering pump assembly as defined in claim 12, wherein said shaft sleeve is threaded on and axially removable from the impeller-driving portion of said shaft.

* * * * *

UNITED STATES PATENT AND TRADEMARK OFFICE
CERTIFICATE OF CORRECTION

PATENT NO. : 6,582,193 B1
DATED : June 24, 2003
INVENTOR(S) : Keyes et al.

It is certified that error appears in the above-identified patent and that said Letters Patent is hereby corrected as shown below:

<u>Title page,</u>
Item [73], insert -- Assignee:  DaimlerChrysler Corporation, Auburn Hills, Michigan --.

Signed and Sealed this

Twenty-eighth Day of October, 2003

JAMES E. ROGAN
*Director of the United States Patent and Trademark Office*